(12) United States Patent
Carcerano et al.

(10) Patent No.: US 6,308,205 B1
(45) Date of Patent: *Oct. 23, 2001

(54) BROWSER-BASED NETWORK MANAGEMENT ALLOWING ADMINISTRATORS TO USE WEB BROWSER ON USER'S WORKSTATION TO VIEW AND UPDATE CONFIGURATION OF NETWORK DEVICES

(75) Inventors: Christopher John Carcerano, Laguna Hills; John Dickson Barnard, Orange; Richard Alexander Wilson, Jr., Coto De Caza; Donald Parke Gibson, Yorba Linda, all of CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,332

(22) Filed: Oct. 22, 1998

(51) Int. Cl.[7] .................................................. G06F 15/177
(52) U.S. Cl. ........................ 709/221; 709/220; 709/228
(58) Field of Search ................................... 709/221, 220, 709/228, 227

(56) References Cited

U.S. PATENT DOCUMENTS

| | | | |
|---|---|---|---|
| 5,327,560 | * | 7/1994 | Hirata et al. .......................... 709/221 |
| 5,414,812 | * | 5/1995 | Filip et al. ............................. 707/103 |
| 5,838,907 | * | 11/1998 | Hansen ................................. 709/220 |
| 6,029,196 | * | 2/2000 | Lenz ..................................... 709/221 |
| 6,041,347 | * | 3/2000 | Harsham et al. ..................... 709/220 |
| 6,070,187 | * | 5/2000 | Subramaniam et al. ............. 709/220 |
| 6,098,116 | * | 8/2000 | Nixon et al. ............................. 710/8 |
| 6,105,066 | * | 8/2000 | Hayes, Jr. ............................. 709/226 |

OTHER PUBLICATIONS

"Canon NetSpot User's Guide for Microsoft® Windows®", Release 3.01, Canon, Inc., 1996–1998.

"Canon NetSpot™ Quick Start Guide", Canon, Inc., 1996–1998.

Stanek, William R., "Writing CGI Scripts", *Web Publishing Unleased, Professional Reference Edition*, Sams.net Publishing, pp. 646–673, 1997.

* cited by examiner

*Primary Examiner*—Krisna Lim
(74) *Attorney, Agent, or Firm*—Fitzpatrick, Cella, Harper & Scinto

(57) ABSTRACT

Viewing and updating a configuration of at least one of a plurality of network devices connected to a network. Each of the network devices is repeatedly polled over the network by a network management server for configuration information, which is stored in a database. A first URL-encoded request is received from a requesting station, which is preferably a web browser. The first request identifies a targeted one of the network devices. Responsive to the first request, a response is dynamically generated. The response is representative of a visual display of the configuration information for the targeted one of the network devices based at least in part on the configuration information stored in the database. The response is sent to the requesting station, and a second URL-encoded request is received from the requesting station, the second request including configuration data for the targeted one of the network devices. Responsive to the second request, the database is updated based on the configuration data. The configuration of the targeted one of the network devices is updated by the network management server based on the updated database.

98 Claims, 10 Drawing Sheets

BROWSER-BASED NETWORK MANAGEMENT ALLOWING ADMINISTRATORS TO USE WEB BROWSER ON USER'S WORKSTATION TO VIEW AND UPDATE CONFIGURATION OF NETWORK DEVICES

BACKGROUND OF THE INVENTION

1. Field of the Invention

The present invention is directed to a system for viewing and updating a configuration of network devices. More particularly, the invention is directed toward a system that allows such viewing and updating of configuration from a remote network site using a web browser.

2. Description of the Related Art

As a result of increasing complexity of local area networks, tools for effectively managing (i.e., controlling, monitoring and obtaining the status and configuration of) network devices on the networks are becoming essential. For example, networks can now support diverse network devices such as printers, scanners, digital cameras, facsimile machines, copiers and the like. In addition, local area networks (LANs) can be connected together to form wide area networks (WANS). Each device on these networks has settable configurations. Thus, tools are needed for effectively viewing and updating the configuration and status of the devices.

Conventionally, the configuration of each device on a network is managed with a special purpose program specific to that device or type of device. As a result, a network administrator must learn how to interact with many different programs in order to view and update the configuration of each of the different device types on the network. Because each program is different, learning how to interact with these different programs wastes time and adds unnecessary complexity to managing the network.

In addition, in conventional systems, each network administrator uses a program that directly interacts with each network device. For example, in a printer context, each administrator's printer manager sends configuration queries or commands to printers on the network. All of these separate queries and commands lead to excessive network traffic. Also, if many network administrators are involved, such as in the case of several LANs connected together in a WAN, a printer on the network can become overburdened in responding to all of the administrators' printer managers, detracting from device-specific work such as printout of print jobs.

SUMMARY OF THE INVENTION

Accordingly, what is needed is a management tool that allows each user to control, monitor and obtain the status and configuration of a plurality of network devices using a single and preferably familiar interface. In addition, this tool should allow many administrators to view and update the configuration of the network devices without generating excessive network traffic that can overburden those devices.

The invention addresses the foregoing need by providing a system that allows a remote network user to view and update the configuration of network devices by using a web browser on the user's workstation. The system communicates with the web browser using hypertext transfer protocol (HTTP). Requests from the browser are URL-encoded according to HTTP, and are preferably URL-encoded for CGI scripts, ASP web pages, or any other scripts or pages that can be used by the system to dynamically generate responses to the requests. The responses to the web browser's requests preferably are in hypertext markup language (HTML).

By virtue of the foregoing operation, network administrators can view and update the configuration of network devices using the familiar interface of a web browser, such as NetScape®'s Navigator or Microsoft®'s Internet Explorer. As a result, the administrators do not need to learn different programs for each device, thereby saving time and simplifying network management.

The management system is interposed between the administrators (or other users) and the network devices. The management system repeatedly polls the network devices for configuration information and maintains a database of this information. When the management system receives a request from a web browser for status or configuration information about a network device, the system generates an appropriate response based on the database rather than on information obtained directly from the network device. Likewise, when the management system receives a request from a web browser to change the status or configuration of a network device, the system updates the database according to configuration data in the request. The management system then updates the configuration of the network devices according to the updated database.

This arrangement is more efficient than conventional systems because the network devices are insulated from interacting directly with each user. Instead, the network devices only interact with the management system, which in turn handles all communication with the users. Thus, the network devices are not overburdened by having to communicate with many different users.

Accordingly, in one aspect, the invention is a system that allows a remote network user to view and update a configuration of at least one of a plurality of network devices connected to a network, by using a web browser on the user's workstation. The system repeatedly polls each of the network devices over the network for configuration information. The configuration information is stored in a database. A first URL-encoded request is received from a user's workstation, preferably using a standard web browser communicating using HTTP. The first request identifies a targeted one of the network devices, together with a request for the targeted device's configuration. Responsive to the first request, a response corresponding to the requested configuration is generated dynamically from the database, with the response preferably being in a format representative of a visual display of configuration information for the targeted network device. The response is preferably dynamically-generated HTML code based at least in part on the configuration information stored in the database and on a template. The response is sent to the requesting station. A second URL-encoded request may also be received from the requesting station, with the second request including an update to the configuration data for the targeted network device. Responsive to the second request, the database is updated based on the new configuration data. The management system thereafter updates the targeted network device based on the updated database.

By virtue of the foregoing, a network administrator only has to know how to interact with a web browser in order to view and update the configuration of the network devices. The administrator does not have to learn separate programs for each device or device type. In addition, in a case that plural different web browsers are making such requests, the network devices themselves are insulated from all of those requests. Instead, the network devices need only respond to polling and updating by the management system. As a result, the network devices are not overburdened by the requests.

In another aspect, from the perspective of a user's workstation which is preferably executing a web browser, the invention sends a first URL-encoded request to a management system. The first request identifies a targeted one of the network devices. A response according to HTTP is received from the management system, preferably in the form of HTML code. The response is representative of a visual display of configuration information for the targeted network device, and is displayed to the user by the user's browser. In response to user manipulation of the displayed response, a second URL-encoded request is sent to the management system. The second request includes updated configuration data for the targeted network device.

By virtue of the foregoing, a web browser can be used by a user's workstation to view and update the configuration of any of plural network devices. In addition, these network devices are insulated from direct interaction with all of the requesting stations.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
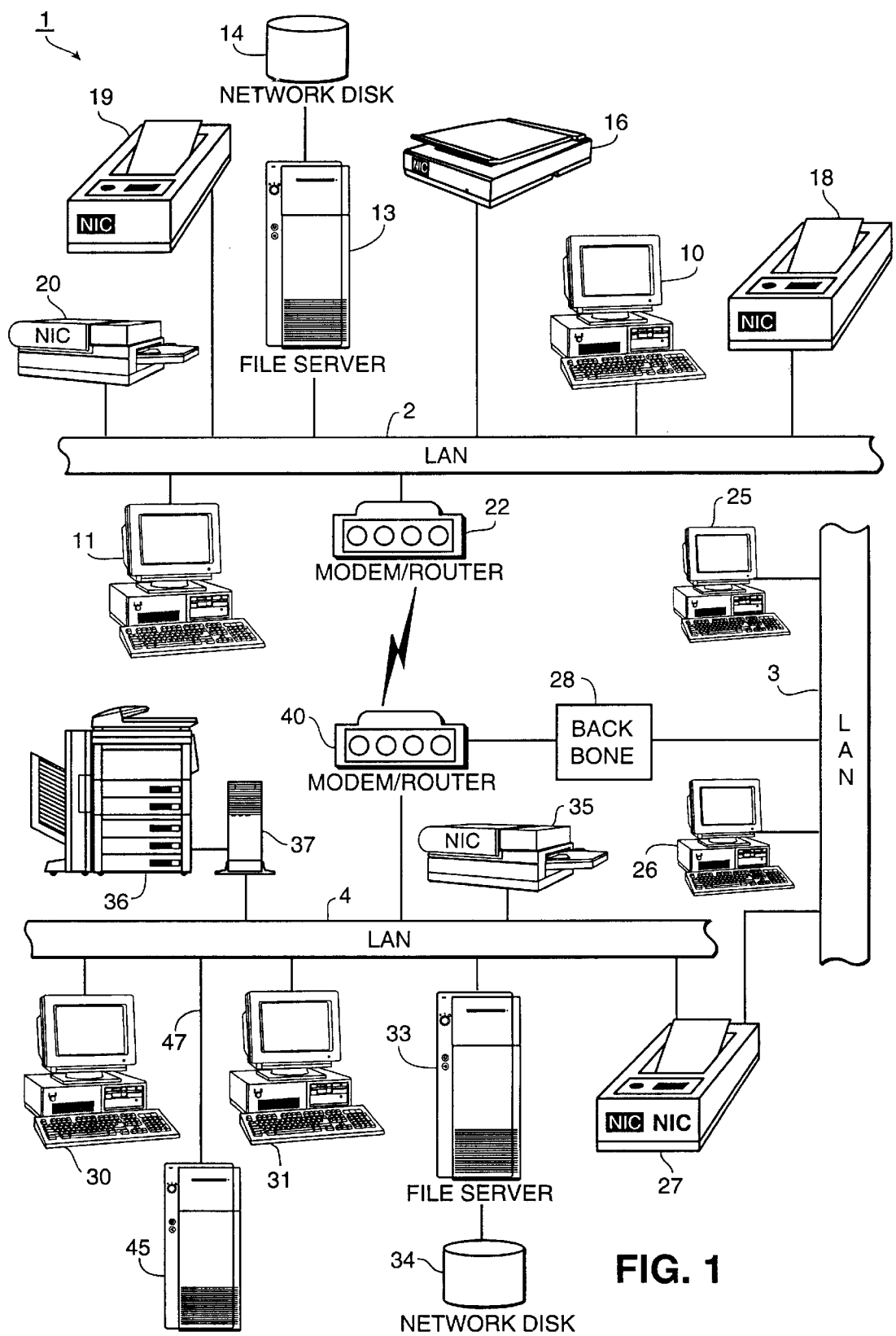
FIG. 1 is a view of a representative network in which the present invention may be utilized.

FIG. 1 is a view of a representative network in which the present invention can be utilized. Network 1 includes local area network (LAN) 2, LAN 3, and LAN 4, which are interconnected into a wide area network (WAN).

Workstations 10 and 11 are connected to LAN 2. Workstations 10 and 11 run an operating system such as Microsoft Windows 95, Microsoft Windows NT® or UNIX, and each includes network modules to support networking. The network modules allow each of workstations 10 and 11 to utilize the resources connected to the WAN.

Also connected to LAN 2 are file server 13 and network disk 14, which provides shared storage to devices connected to LAN 2. File server 13 runs a network operating system, such as Novell®, Microsoft Windows NT® or UNIX, in order to provide file services to the WAN.

In addition, LAN 2 includes managed network devices, such as scanner 16 which provides scanner services, and printers 18, 19 and 20 which provide printer services. Each of these managed network devices includes a network interface device such as a network interface card (NIC), which interfaces the network devices directly to LAN 2, without the need for a dedicated workstation or server.

The NICs preferably gather information about device usage, status, jobs and the like. In addition, the NICs provide device-specific services such as job buffering and spooling, as well as management functionality to the associated network devices. The NICs also are managed according to the invention, as discussed more fully below.

LAN 2 further includes modem/router 22, which allows connection to other networks. The network operating system and network modules on file server 13 and workstations 10 and 11 allow those devices to utilize resources on the other LANs. Likewise, other networks preferably can utilize some or all of the devices on LAN 2.

Workstations 25 and 26 are connected to LAN 3. Managed network devices such as printer 27 also are connected to LAN 3 through NICs. In FIG. 1, printer 27 is connected to LAN 3 through one of two NICs in printer 27. Printer 27 provides printer services to devices on the WAN. Both the network devices and the NICs that connect those network devices to LAN 3 are managed by the browser-based network management system of the invention.

Backbone 28 connects LAN 3 to other networks. This connection allows the devices on LAN 3 to utilize resources on other LANs, as well as making some or all of the devices on LAN 3 available for use by the other LANs. Preferably, backbone 28 is a high-speed dedicated line such as a T1 line along with the associated hardware necessary for the connection.

Workstations 30 and 31 are connected to LAN 4, along with file server 33 and network drive 34. File server 33 can run the same operating system as file server 13 of LAN 1, or file server 33 can use an entirely different operating system.

Managed network devices such as printer 27, printer 35 and printer/copier 36 are connected to LAN 4. Printer 27 is connected to LAN 4 through the second one of the two NICs in that printer. Printer 35 also is connected to LAN 4 through a NIC. Printer/copier 36 is connected to LAN 4 through printer server 37. Printers 27 and 35 provide printer services to devices on the WAN, and printer/copier 36 provides printer, copier and preferably scanner services to the WAN. Printer server 37 and the NICs in printers 27 and 35 all preferably gather information about printer usage, printer status, print jobs and the like. In addition, the printer server and the NICs provide device-specific services to their respective devices, such as print job buffering and spooling, as well as management functionality for the associated printers. All of these network devices and the corresponding NICs are preferably managed using the browser-based network management system of the invention.

Modem/router 40 provides LAN 4 with a connection to other LANs. This connection allows the devices on LAN 4 to utilize the other networks. In addition, the connection preferably allows those other networks to use some or all of the devices on LAN 4.

Thus, all three LANs are interconnected, enabling a device on one of the LANs to access devices on the other two LANs. For example, workstation 10 on LAN 1 preferably can share files with workstation 25 on LAN 3, store or read data from network disk 34 on LAN 4, and print to printer 35 on LAN 4.

For security reasons, access to certain devices on each of the LANs may be limited. For example, access to certain portions of data stored on network disk 14 could be limited to workstations 10 and 11, or even to just file server 13.

Other managed network devices can be connected to each of the LANs, as indicated by the curved break lines shown at the ends of the LANs. Examples of such devices are facsimile machines, telephone controllers, digital cameras, and automated production and control devices used in manufacturing. These devices can be connected to network 1 along with other workstations (including so-called thin and thick clients), servers, printers, scanners, modems, and the like in innumerable ways. In addition, the network can be connected to other networks, including the World Wide Web, thereby creating a vast network of a multitude of devices. So-called virtual networks can also be created by forming a network from a subset of the devices connected to the World Wide Web. The invention is equally applicable to these different networks, as well as to networks that have different architectures and that are connected in different ways, such as wireless networks. All of the devices and the NICs on these networks can be managed using the browser-based network management system of the invention.

Server 45 shown in FIG. 1 is a standalone system that executes the browser-based network management system according to the invention. Server 45 may be a Macintosh®, PC-compatible, or other type of system having an operating system such as a windowing operating system, like Microsoft Windows NT®, or a non-windowing operating system such as DOS or UNIX. In the preferred embodiment, server 45 is a Pentium®-based computer system operating under Microsoft Windows NT®.

Server 45 preferably does not have a keyboard, pointing device or monitor attached thereto, but rather serves only to run the network management system of the invention. Of course, a keyboard, pointing device and display can be attached to server 45 if so desired.

Network interface 47 provides server 45 with an interface to network 1. Although network interface 47 is shown as connected directly to LAN 4, other arrangements are possible. For example, network interface 47 can connect server 45 to network 1 through a modem, LAN, WAN, backbone or any other network connection. Network interface 47 can comprise any type of connection that supports network communications, along with the associated hardware such as a communication card. Examples of such connections include a 10baseT cable, a thin or thick Ethernet cable, a wireless network connection or a cellular telephone connection. Network interface 47 supports one or more network protocols such as IP, IPX or NetBIOS.

Server 45 is shown in FIG. 1 as a programmable general-purpose computer; however, server 45 for managing network devices can be any other type of data processing equipment that can access network 1 and that can run the browser-based network management system according to the invention. The architecture of server 45 and the operation of the network management system running on server 45 are explained in more detail below with reference to FIGS. 4 and 5.

Figure 2:
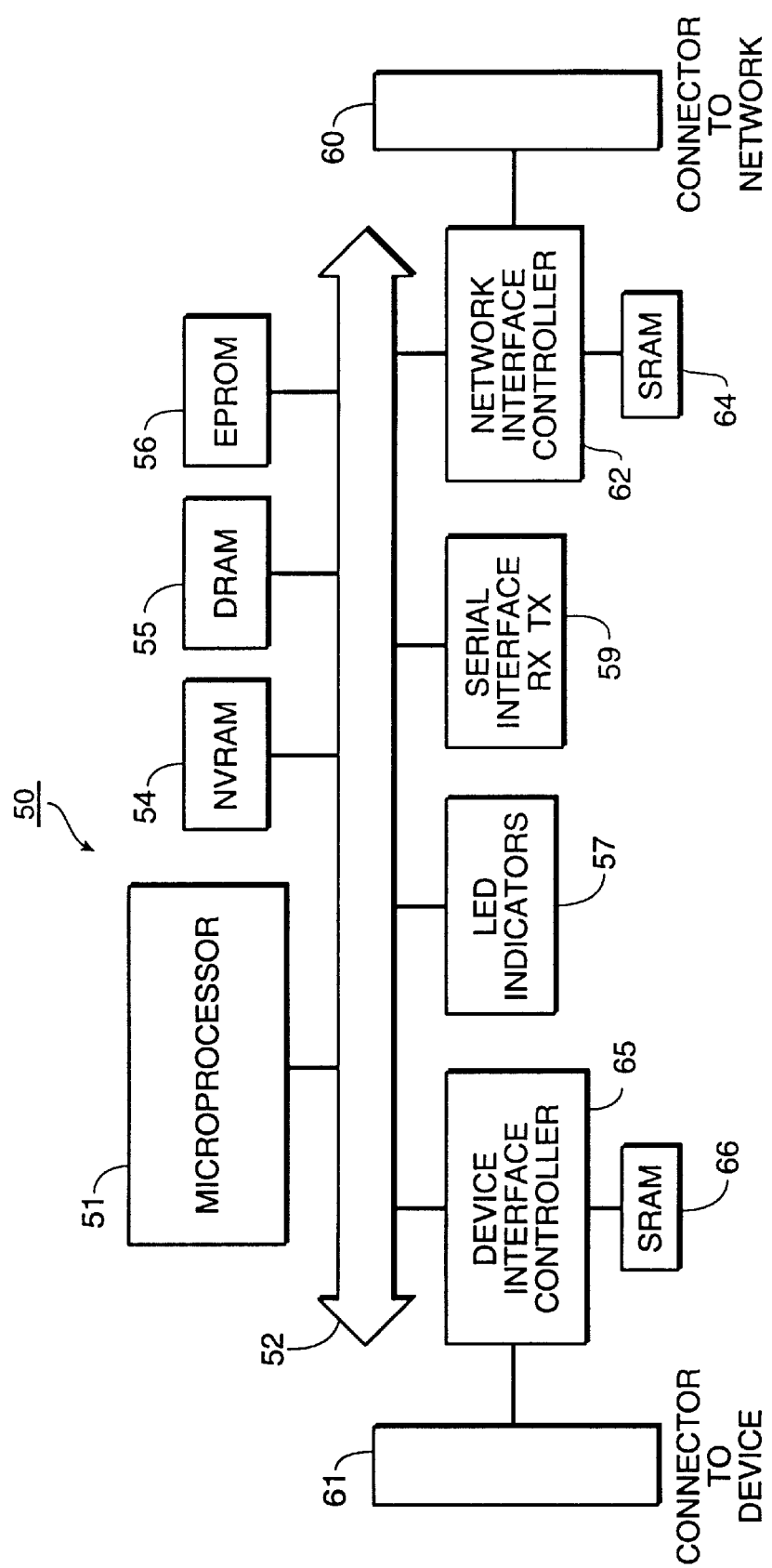
FIG. 2 is a block diagram of a representative network interface.

FIG. 2 is a block diagram of representative network interface device 50, such as a NIC, for interfacing a managed network device to a network. As shown in FIG. 2, the network interface device includes central processing unit (CPU) 51 such as an Intel 80188 8-bit programmable microprocessor which is interfaced to computer bus 52. Also interfaced to computer bus 52 are non-volatile RAM (NVRAM) 54, dynamic RAM (DRAM) 55, electrically erasable programmable read only memory (EEPROM) 56, drivers for LED indicators 57, and serial interface 59 which includes both a transmit and a receive terminal.

Configuration parameters and other important information concerning the configuration of network interface device 50 are ordinarily stored in NVRAM 54, where such information may be stored between power cycles. Process steps for execution by microprocessor 51 are stored in EEPROM 56, but in general, before those process steps are executed, they are copied from EEPROM 56 into DRAM 55 for execution out of DRAM 55.

LED indicators 57 are provided so as to give a user a general indication as to the processing status of the network interface, and may include, for example, indicator LEDs for power and data communication. Serial interface 59 is provided so as to allow local serial access to the network interface device.

As mentioned previously, network interface device 50 is disposed between a network and a managed network device, and is therefore provided with a connector 60 for connecting to the network as well as a connector 61 for connecting to the managed network device. Network interface controller 62, which is connected to bus 52 and to network connector 60, provides hardware interface for capturing and assembling network transmissions received by the network interface device and transmitted onto network 1. Static RAM (SRAM) 64 is provided for network interface controller 62 so as to store, on a temporary basis, such network transmissions.

On the device side, device interface controller 65, which is connected to bus 52 and network device connector 61, provides a device interface between the network interface device and the managed network device serviced by the network interface device. Device interface controller 65 may be of any of a variety of different controllers, and can, for example, be constructed for a bi-directional interface (such as a SCSI interface, an IEEE 1284 interface, a dual port RAM interface, a shared RAM interface, and the like) or a unidirectional interface (such as a standard Centronix RS-232 interface or the like). Device interface controller 65 is provided with SRAM 66 for temporary storage of data transmitted between the network interface device and the network device.

The contents of NVRAM 54 and EEPROM 56 can be changed in order to manage network interface device 50, including changing the configuration of network interface device 50 and updating (flashing) the process steps stored in EEPROM 56. For example, the queue size, default protocol stack, network frame type, ROM (EEPROM) version and the like for network interface device 50 can be changed. In addition, changes to the network device connected to network interface device 50 can be made through connector 61. For example, the available fonts, default feed tray, default scan mode, device name, and online/offline status can be changed. According to the invention, these changes to network interface device 50 and an attached network device can be made by a user at a remote station using a browser, as explained in more detail below.

Figure 3:
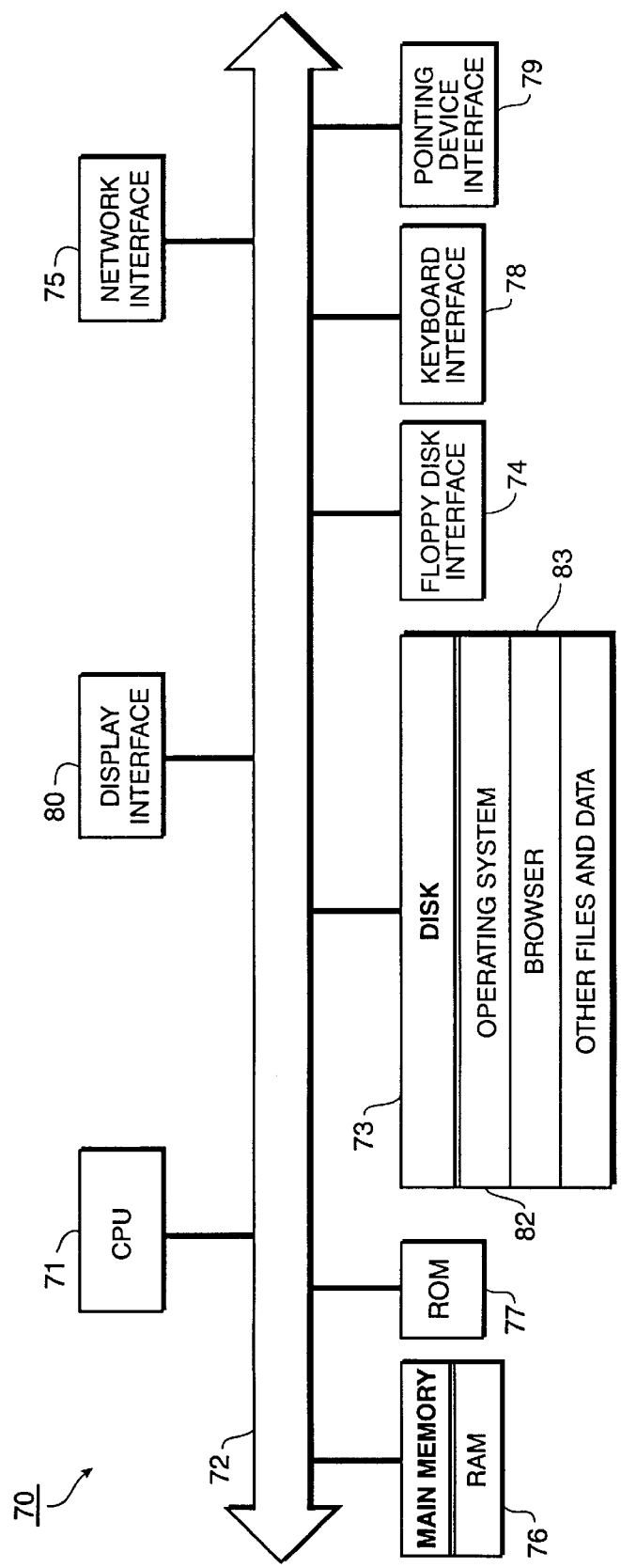
FIG. 3 is a block diagram showing the internal architecture of a remote workstation which can be utilized according to the invention to manage network devices.

FIG. 3 is a block diagram showing the internal architecture of remote workstation 70, such as any of the workstations shown in FIG. 1, which manages network devices according to the invention. As shown in FIG. 3, workstation 70 includes central processing unit (CPU) 71, which interfaces with bus 72. Also interfacing with bus 72 are fixed disk 73, floppy disk interface 74, network interface 75, main memory (RAM) 76, read only memory (ROM) 77, keyboard interface 78 to a keyboard (not shown), pointing device interface 79 to a pointing device (not shown), and display interface 80 to a display (not shown).

Main memory 76 interfaces with bus 72 so as to provide RAM storage to CPU 71 during execution of software applications. More specifically, CPU 71 loads process steps from a computer-readable medium such as fixed disk 73 or some other source such as a network disk into maim memory 76. CPU 71 then executes the stored process steps from main memory 76 in order to execute application programs such as a browser. Data can be stored in main memory 76 or some other writable memory medium. Data also can be stored on a mass storage device such as fixed disk 73 or a network disk, and that data can be accessed by applications through well-known disk-swapping techniques.

As also shown in FIG. 3, fixed disk 73 typically stores operating system 82 which is a windowing operating system such as Microsoft Windows 95, Microsoft Windows NT® or UNIX. Operating system 82 includes network modules to support networking. Also stored on fixed disk 73 are browser 83 and other files and data.

Preferably, browser 83 is a standard web browser such as NetScape®'s Navigator or Microsoft®'s Internet Explorer. Such a standard browser is characterized by an ability to communicate with a server using HTTP. In order for a browser to access information on a server, the browser sends a URL-encoded request to the server. This URL-encoded request identifies the domain name of the server (e.g., www.canon.com), as well as the location of a file or resource on the server. Typically, the file or resource is an HTML page or a script such as a CGI script. Data for use by the file or resource optionally is encoded into the URL-encoded request. The file or resource is accessed by the server, and the server uses the file or resource along with the URL-encoded data in order to generate a response. The response is sent to the browser, which uses the response to generate a visual or textual display for a user.

Alternatively, browser 83 can be a dedicated thin client program that communicates using HTTP. The operation of browser 83 according to the invention is explained in more detail below with reference to FIG. 5.

Workstation 70 preferably is a programmable general-purpose computer. Alternatively, workstation 50 can be a dedicated thin client that server only to run operating system 82 and browser 83. In addition, workstation 70 can be local to server 45, or workstation 70 can be remote from that server, for example connected through a LAN, WAN or the World Wide Web.

Figure 4:
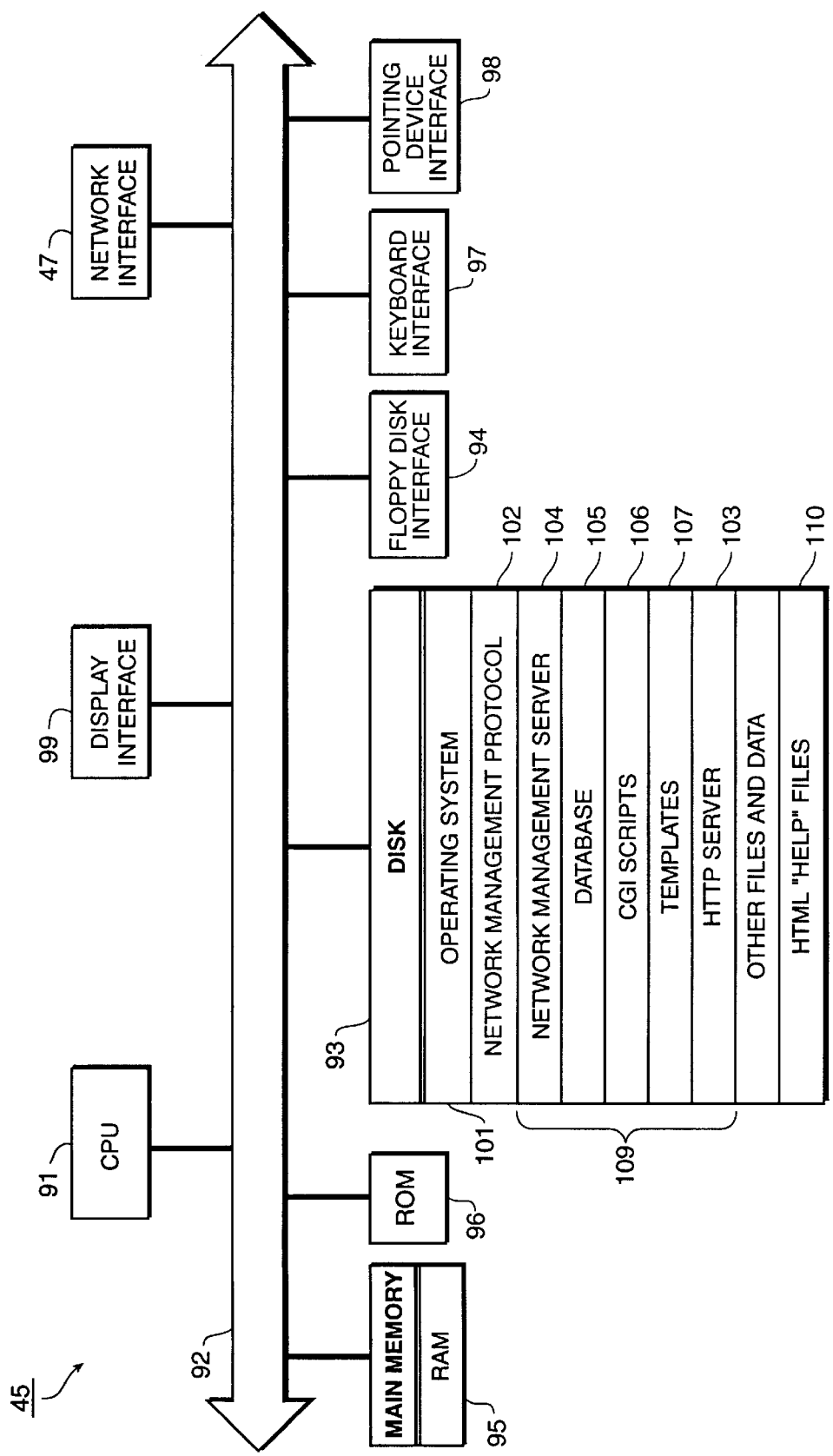
FIG. 4 is a block diagram showing the internal architecture of a server according to the invention that allows a remote workstation to manage network devices.

FIG. 4 is a block diagram showing the internal architecture of server 45 on which runs the browser-based network management system of the invention. As shown in FIG. 4, server 45 includes central processing unit (CPU) 91, which interfaces with bus 92. Also interfacing with bus 92 are network interface 47, fixed disk 93, floppy disk interface 94, main memory (RAM) 95 and read only memory (ROM) 96. In addition, even though server 45 preferably is a stand-alone system, keyboard interface 97, pointing device interface 98, and display interface 99 interface with bus 92 so that a keyboard, pointing device and display can be added if desired.

Server 45 communicates with devices on network 1 through network interface 47. In addition, if workstation 70 is attached to network 1, server 45 communicates with browser 83 running on workstation 70 through network interface 47 to network 1. However, if workstation 70 is not attached to network 1, server 45 communicates with browser 83 on workstation 70 through the network to which workstation 70 is attached, either through network interface 47 or through some other interface or network connection (not shown). In any case, server 45 communicates with browser 83 on workstation 70 using HTTP.

Main memory 95 interfaces with bus 92 so as to provide RAM storage to CPU 91 during execution of software applications. More specifically, CPU 91 loads process steps from a computer-readable medium such as fixed disk 93 or some other source such as a network disk into maim memory 95. CPU 91 then executes the stored process steps from main memory 95 in order to execute application programs such as an HTTP server and a network management server according to the invention. Data, including a database, CGI scripts and templates (or ASP web pages) for HTML code according to the invention, can be stored in main memory 95, or some other writable memory medium. Data also can be stored on a mass storage device such as fixed disk 93 or a network disk, and that data can be accessed by applications through well-known disk-swapping techniques.

As also shown in FIG. 4, fixed disk 93 typically stores operating system 101, network management protocol handler 102, and components of browser-based network management system 109 according to the invention. These components include HTTP server 103, network management server 104, database 105, CGI scripts 106, and templates 107 for HTML code according to the invention. ASP web pages (not shown) can be stored on fixed disk 93, either in addition to or in place of CGI scripts 106 and templates 107. Other applications, data and network utilities also can be stored on fixed disk 93.

As shown, each of these components of browser-based network management system 109 preferably resides on a single server such as server 45. However, it is entirely possible for each of these components to reside on a separate file server, workstation or network drive, in which case the components communicate, for example, through network 1.

HTML "help" files 110 also are preferably stored on fixed disk 93. These help files can be accessed by browser 83 running on workstation 70 in order to assist a user in using the browser-based network management system according to the invention. Although these help files preferably reside on fixed disk 93, HTML help files 110 can reside anywhere in network 1 that can be accessed by browser 83, such as on workstation 70.

Figure 5:
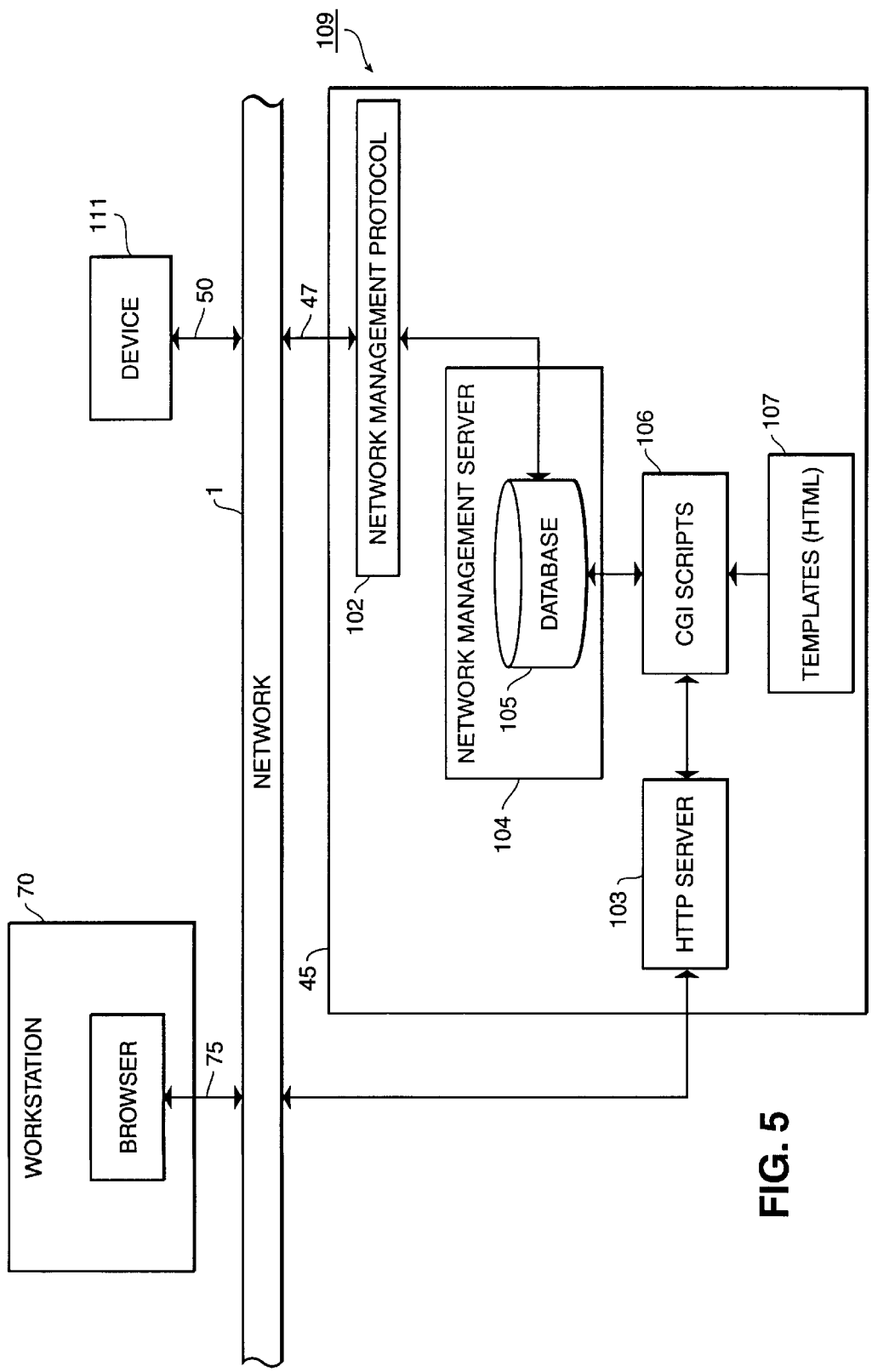
FIG. 5 is a block diagram for explaining the operation of the browser-based network management system according to the invention.

FIG. 5 is a block diagram for explaining the operation of browser-based network management system 109 according to the invention, which preferably includes at least network management protocol handler 102, HTTP server 103, network management server 104 with database 105, CGI scripts 106, and templates 107. Preferably, all of these components reside on server 45. As mentioned above, ASP webs pages can be included in place of (or in addition to) CGI scripts 106 and templates 107.

In FIG. 5, browser-based network management system 109 on server 45 communicates with network 1 through network interface 47. Managed network device 111, which includes network interface device 50, is attached to network 1. Thus, browser-based network management system 109 communicates with network interface device 50 of device 111 in order to manage both the network interface device and the device itself.

Browser-based network management system 109 and network interface device 50 communicate using a management protocol such as the simple network management protocol (SNMP) or device management interface (DMI). In order to enable server 45 to use this protocol, network management protocol handler 102 handles network management messages sent between network management server 104 and devices attached to network 1. Messages in this management protocol are packaged by network management protocol handler 102 into at least one of the network protocols used by network 1, for example IP, IPX or NetBIOS.

Network management server 104 maintains database 105 based on the status and configuration of network devices on network 1. Network management server 104 maintains this database by repeatedly polling the devices on network 1 through network interface 47 using network management protocol handler 102. Preferably, this polling operation occurs periodically, once every few minutes.

Network management server 104 also looks to database 105 in order to determine if changes have been made to the database by the other components of browser-based network management system 109, particularly by HTTP server 103 through CGI scripts 106, as explained in more detail below. If the database has been changed, network management server 104 makes appropriate changes to the status and configuration of devices on network 1 through network protocol management handler 102 and network interface 47. Preferably, these changes to the managed devices are made using SNMP messages.

CGI scripts 106 are responsible for making changes to database 105. In particular, HTTP server 103 calls CGI scripts 106 in response to URL-encoded requests from browser 83 on workstation 70, for entering an update to status and configuration information of a network device. Thus, if a URL-encoded request includes changes to the status or configuration of a device on network 1, the CGI script called by HTTP server 103 in response to that request enters those changes into database 105.

In addition to entering changes into the database, CGI scripts are called by HTTP server 103 to dynamically generate a response to a URL-encoded request for current status and configuration information about a device on network 1. These CGI scripts preferably use templates 107, which are HTML templates, to dynamically generate a visual display representative of the status and configuration of a targeted device or devices specified in the URL-encoded request. This visual display is at least partially based on data from database 105 and preferably is encoded as HTML code which HTTP server 103 can use to respond to the URL-encoded request. However, in other embodiments, CGI scripts 106 dynamically generate text or some other data representative of a device's status and configuration.

Templates 107 are templates for generating HTML code for a particular device or class of devices. In addition, a template for a device list of all devices that can be managed by browser-based network management system 109 preferably is provided.

While the invention preferably uses CGI scripts 106 and templates 107 to generate HTML code, in alternative embodiments the invention can use any other type of script, web page, data or program that allows HTTP server 103 to dynamically generate a response to a browser's request. For example, Active Server Protocol (ASP) web pages can be used in place of CGI scripts 106 and templates 107. In that case, URLs for ASP web pages are designated in the URL-encoded requests received by HTTP server 103 from browser 83. When HTTP server 103 processes an ASP web page, the instructions in the ASP web page are executed so as to access and, if necessary, modify database 105. In addition, these instructions format the HTML code in the ASP web page in accordance with the data from database 105. Then, HTTP server 103 can respond to the URL-encoded request using the formatted HTML code, as appropriate.

HTTP server 103 receives the URL-encoded requests from browser 83 and processes those requests. According to the preferred embodiment of the invention, the URL in a request identifies one of CGI scripts 106. HTTP server 103 executes the CGI script, as discussed above, so as to dynamically generate a response to the URL-encoded request. This response, which is sent to browser 83, preferably is representative of a visual display of a targeted device's status and configuration. In addition, by executing a CGI script that is identified by a URL-encoded request to update status or configuration of a targeted device, HTTP server 103 changes the status and configuration entries in database 105 for that device.

Browser 83 communicates with HTTP server 103 of browser-based network management system 109 through network interface 75. In FIG. 5, browser 83 is running on workstation 70, which is connected to network 1. Thus, HTTP server 103 that is running on server 45 communicates with browser 83 on workstation 70 through network 1, using network interface 47. However, it is possible that workstation 70 is not connected to network 1. In that case, HTTP server 103 on server 45 communicates with browser 83 on workstation 70 using an unshown interface on server 45.

Browser 83 uses HTTP to communicate with HTTP server 103 running on server 45. Browser 83 sends URL-encoded requests to and receives HTML coded responses from the HTTP server. According to the invention, the URL-encoded requests identify a network device on network 1 so as to request status and configuration information for that network device. The URL-encoded requests also contain updates to status and configuration information for updating the status and configuration of a targeted network device. Thus, browser 83 uses HTTP communication to control, monitor and obtain the status and configuration of network devices on network 1.

Briefly, in operation, browser-based network management system 109 allows a user on a remote workstation to use a browser to change, monitor and obtain the status and configuration of devices of network 1. According to the invention, browser-based network management system 109 repeatedly polls each of the network devices over network 1 for configuration information. This configuration information is stored in database 105. The management system communicates with a requesting workstation using HTTP, preferably sending the requesting station HTML code for a visual display representative of status and configuration for a targeted device and preferably receiving a URL-encoded request including updated configuration data for the targeted device. The management system updates the database based on this communication. The configuration of one of the network devices is updated based on the updated database, using a network management protocol.

In more detail, browser-based network management system 109 repeatedly polls each of the network devices over network 1 for configuration information. First, network management server 104 extracts a list of devices that can be managed from database 105. Then, network management server 104 sends messages to those devices through network management protocol handler 102. The messages are preferably in a network management protocol format such as SNMP or DMI.

In response, the network interface devices on the queried network devices respond with status and configuration information. This information is for the network devices and for the network interface devices (e.g., NICs) for those network devices. Examples of device status and configuration information include available fonts, default feed tray, default scan mode, device name, online/offline status, and the like. Examples of network interface device status and configuration information include queue size, default protocol stack, network frame type, ROM (EEPROM) version, and the like.

In order to account for the addition and removal of devices from network 1, network management server 104 also repeatedly performs a device discovery operation. This device discovery operation is performed by searching a user-specified range of network addresses on the network for devices that respond to specific SNMP (or other management protocol) queries. These queries preferably ask a supported network device to respond with information about the device's network adapter, device name, device type and location. Devices that generate acceptable responses are entered into the database as devices that the network management system can support. Devices that respond with errors are ignored. The device discovery process is preferably repeated periodically so as to discover devices that are added to network 1. In addition, the device discovery process is performed on system startup.

The results of the device discovery and polling operations are stored in database 105. As a result, the data in database 105 continuously reflects the current status and configuration of supported devices on network 1.

Browser-based network management system 109 communicates with a requesting station such as workstation 70 using HTTP. In order to obtain and monitor status and configuration of a managed device (or the network interface device for that managed device), browser 83 on workstation 70 sends a URL-encoded request for status or configuration information about a managed network device on network 1. In response, HTTP server 103 accesses the CGI script identified in the URL-encoded request so as to dynamically generate a response representative of a visual display of the status and configuration. This response is generated by filling in one of templates 107 with data from database 105. The response is communicated to browser 83, which displays the visual display.

In order to change status or configuration of a managed device (or the network interface device for that managed device), browser 83 on workstation 70 sends a URL-encoded request to HTTP server 103 including updated configuration data for a targeted device. In response, HTTP server 103 calls the CGI script identified in the URL for the request. The CGI script updates database 105 according to the configuration request. Then, when network management server 104 next updates devices on network 1 in accordance with database 105, the status or configuration of the device is updated, using the network management protocol provided by network management protocol handler 102.

Figure 6:
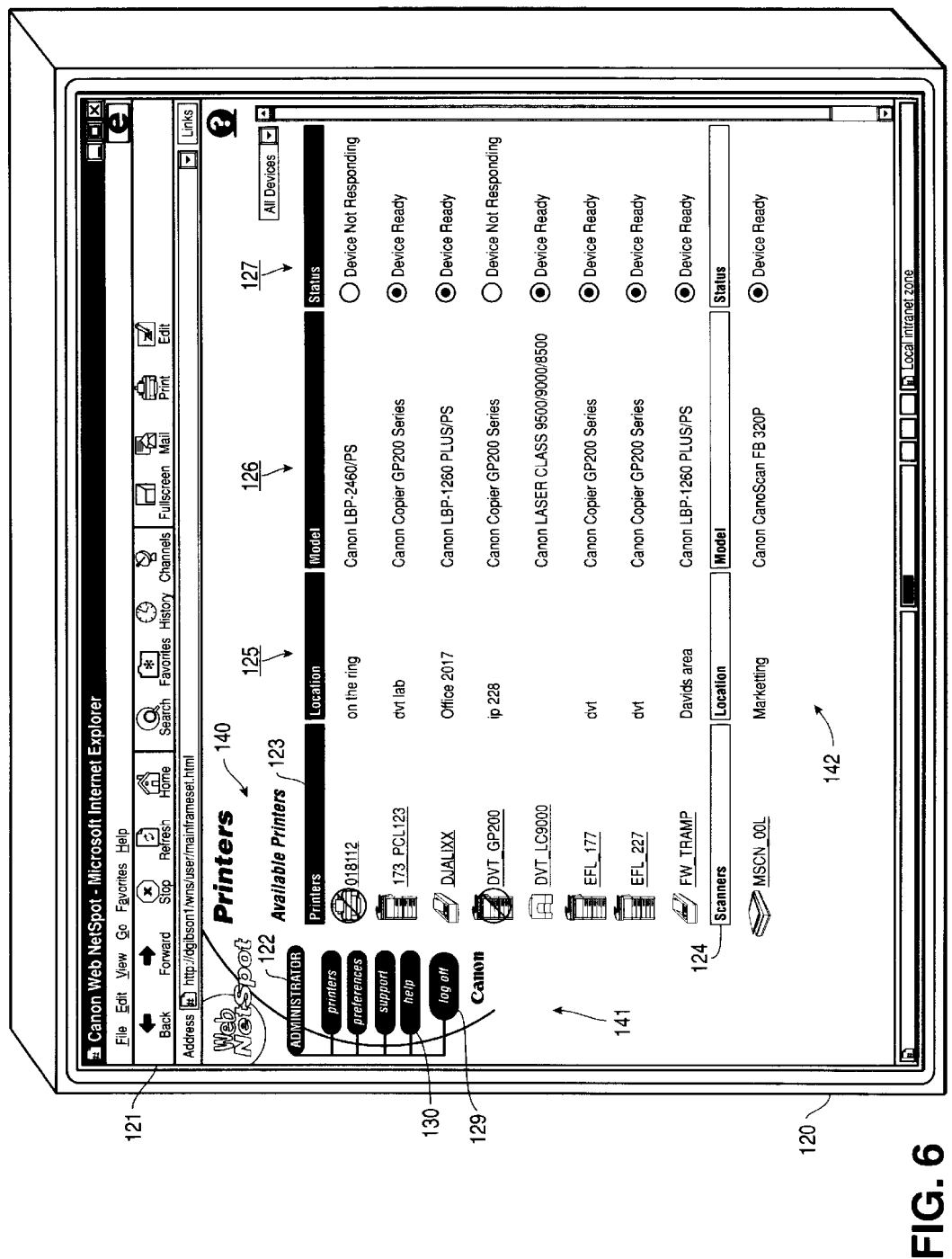
FIGS. 6 and 7 are representational views of HTML code generated according to the invention, shown in the way that a browser would display such code to a user on a display for the user's workstation.

FIG. 6 is a representational view of HTML code generated according to the invention, shown in the way that browser 83 would display such code to a user on display 120 for the user's workstation. This workstation can be any one of the workstations or servers shown in FIG. 1, or can be another workstation or server that has an HTTP connection to network 1. In addition, the workstation can be topologically local to or remote from browser-based network management system 70.

As shown in FIG. 6, browser interface 121 includes an example of a list of devices that can be controlled and monitored through browser 83 using browser-based network management system 109 according to the invention. Browser interface 121 also includes administrator mode indicator 122, log on/off button 129 and help button 130.

Shown in the list of devices in FIG. 6 are printers section 123 and scanners section 124, which include information about printers and scanners on network 1. It should be noted that browser interface 121 can include sections for other types of devices, such as copiers, digital cameras, facsimile machines and the like, as well as any network interface devices (e.g., NICs) that connect these devices to network 1.

Displayed for each type of device is device location 125, device model 126, and device status 127. Other information can be displayed in the device list. Upon selection of one of these devices, a URL-encoded request is sent to HTTP server 103 identifying that device. In response, as described above, HTTP server 103 accesses a CGI script (or an ASP web page) to dynamically generate HTML code with detailed information about the targeted device.

Administrator mode indicator 122 indicates that browser-based management system 109 is operating in an administrator mode. Accordingly, a user accessing the management system through browser 83 can use the browser to make changes to the status and configuration of devices on network 1. If the network management system is not operating in administrator mode, administrator mode indicator 122 is not displayed. In that case, the system is operating in end user mode, and a user accessing the network management system according to the invention preferably cannot change the status or configuration of devices on network 1. Instead, that user can only monitor and obtain the status and configuration of the network devices. Log on/off button 129 allows a user to toggle from end user mode to administrator mode (password required), or vice versa (no password required).

If a user clicks on help button 130, HTML help pages 110 are accessed so as to provide the user with help on using browser-based network management system 109. These help files can either reside on server 45, as shown above in FIG. 4, or the help files can reside on workstation 70 or at some other location. In any case, the HTML help files advantageously allow a user to obtain help through the same browser interface as is used to manage network devices.

Also illustrated in FIG. 6 is one possible general layout for browser interface 121. In particular, the browser interface has top frame 140, left frame 141 and main frame 142. Top frame 140 shows which navigation button browser 83 currently is operating under (i.e., the identity of the last button activated by a user). Main frame 142 shows what action is currently being performed by a user. Left frame 141 shows a banner, devices buttons corresponding to one or more types of devices that can be managed, log on/off button 129, and help button 130.

Figure 7:
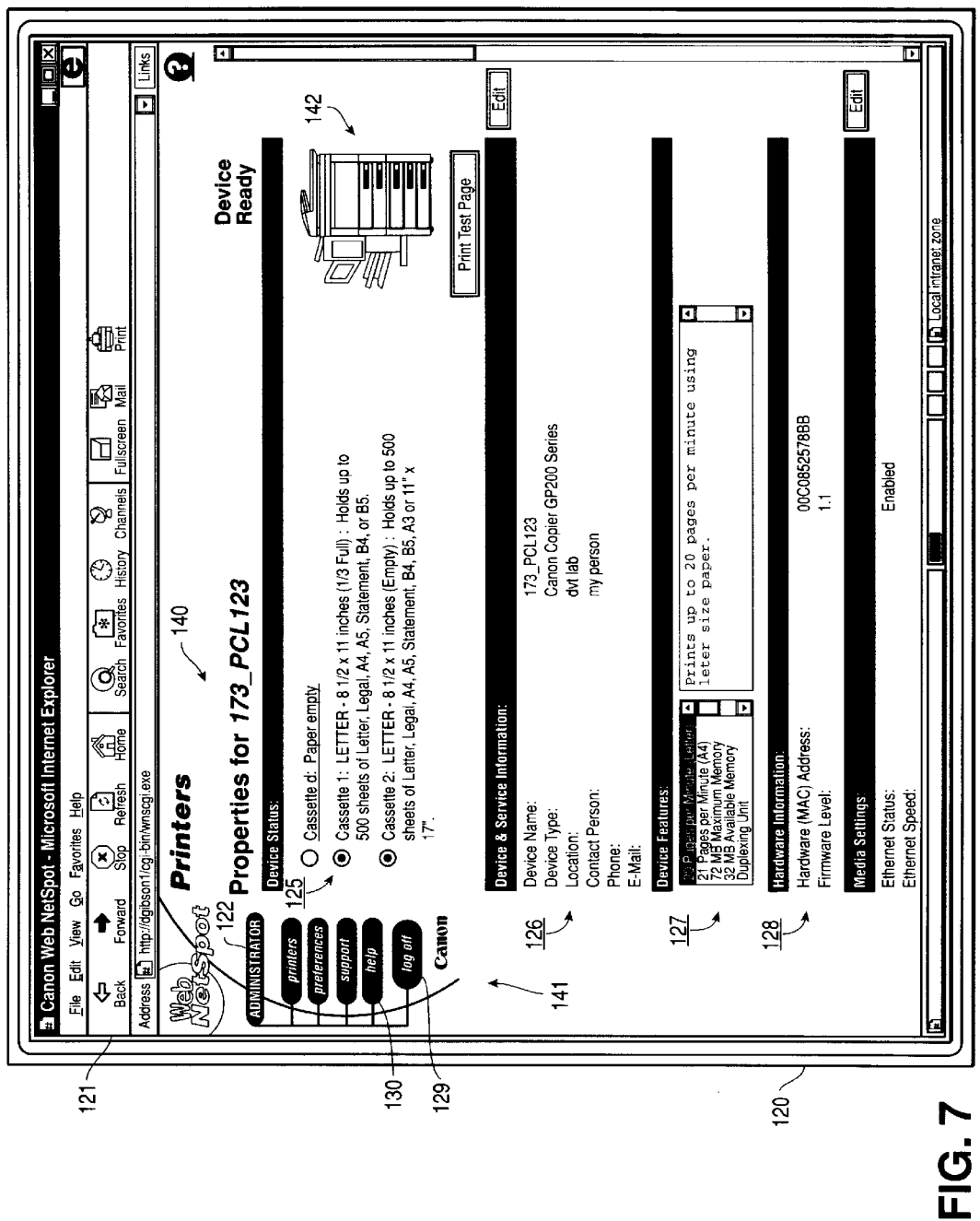

FIG. 7 is a representational view of browser interface 121 displaying detailed information about a particular device on network 1. In the example shown in FIG. 7, a printer has been selected. In response to a URL-encoded request to HTTP server 103, browser 83 has received HTML code identifying device status information 125, device and service information 126, device features 127 and hardware information 128. Accordingly, browser 83 has generated a visual display on browser interface 121 as instructed by this HTML code.

If the user of browser 83 has administrator privileges, as indicated by administrator mode indicator 122, then browser interface 121 can be manipulated to change the status and configuration of the device. For example, the user could change device features 127 so as to enable or disable stapling or sorting. In response to such changes, browser 83 sends an appropriate URL-encoded request identifying the targeted printer and the updated configuration data. As discussed above, HTTP server 103 runs the CGI script (or ASP web page) identified by the URL in the request so as to update database 105 accordingly. Then, network management server 104 modifies the status or configuration of the device according to the updated database.

Other possible pages that can be displayed by browser 83 through browser interface 121 include a preferences page, a support page and an EEPROM flash page. The preferences pages allows a user to monitor and change preferences data for browser 83 and browser-based network management system 109. The support page provides contact information for support of managed devices. Finally, the flash EEPROM page allows a user to flash (update) the EEPROM in a network interface device such as EEPROM 56 shown in FIG. 2. Thus, browser-based network management system 109 can be used to not only configure these network interfaces, but also to update the software that runs those devices.

Figure 8A:
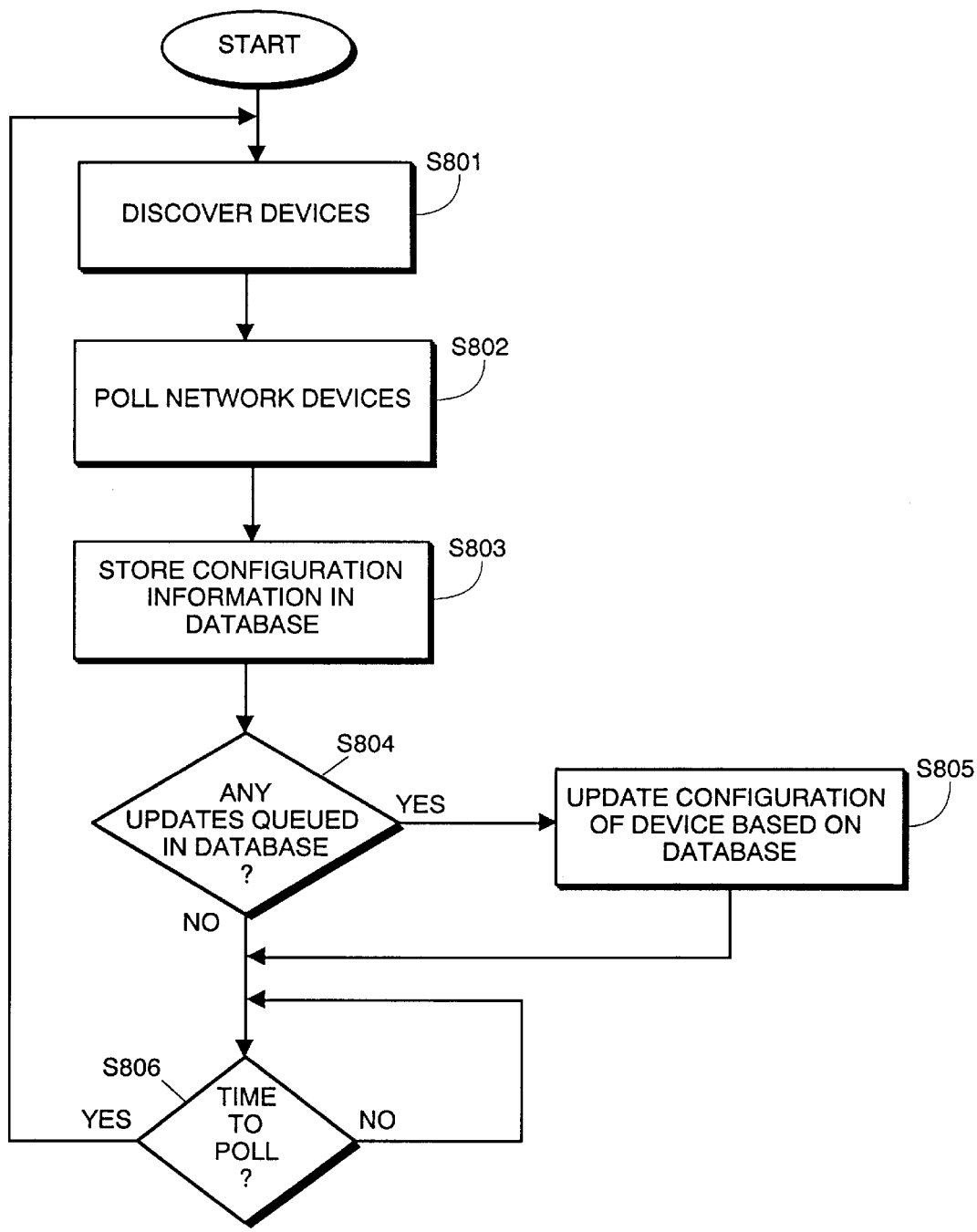
FIGS. 8A and 8B are flowcharts for explaining the operation of the browser-based network management system according to the invention.
Figure 8B:
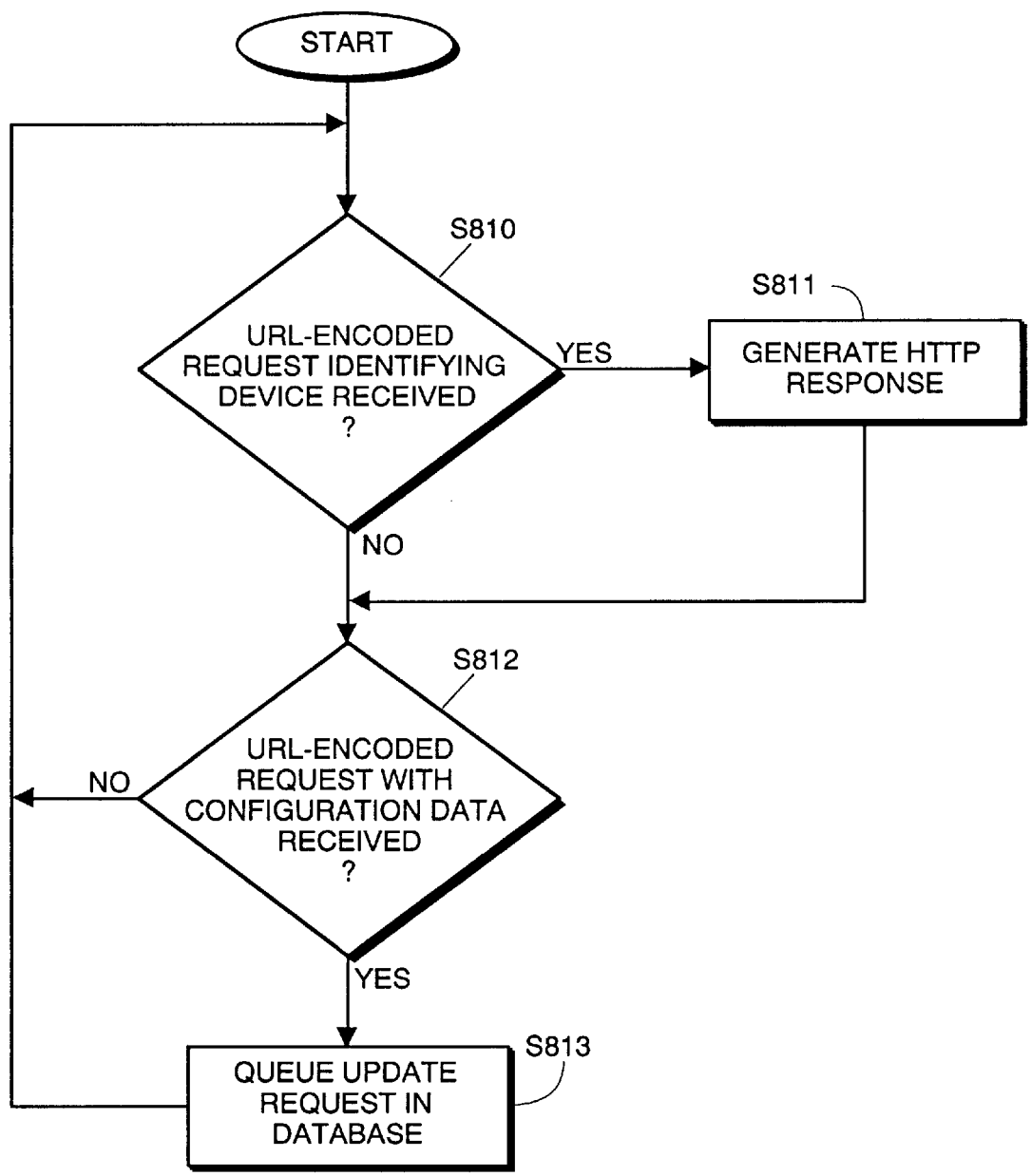

FIGS. 8A and 8B are flowcharts for explaining the operation of the browser-based network management system according to the invention, by which a configuration of at least one of a plurality of network devices connected to a network is viewed and updated. The processes illustrated by FIGS. 8A and 8B preferably run in parallel on server 45.

Briefly, each of the network devices is repeatedly polled over the network, using a network management protocol, for configuration information. The configuration information is stored in a database. A first URL-encoded request is received from a requesting station, the first request including a request for status and configuration information for a targeted network device. The first request identifies a targeted one of the network devices. Responsive to the first request, an HTML-encoded response is dynamically generated. The response is representative of a visual display of the configuration information for the targeted one of the network devices based at least in part on the configuration information stored in the database. The response is sent to the requesting station. A second URL-encoded request is received from the requesting station. The second request includes updates to configuration data for the targeted one of the network devices. Responsive to the second request, the database is updated based on the configuration data in the second request. The configuration of the targeted one of the network devices is thereafter updated based on the updated database, using the network management protocol.

In more detail, the process illustrated in FIG. 8A concerns interactions between the network management system and managed devices. In step S801, network management server 104 discovers network devices on network 1 that can be managed according to the invention. This discovery process is performed by sending specific queries to a user-specified range of network addresses on the network according to a network management protocol such as SNMP or DMI.

Network devices that can be managed by browser-based network management system 109 respond to such queries with information about the devices' network adapters, device names, device types and locations. Network management server 104 enters this information into database 105. Network devices that cannot be managed according to the invention typically either do not respond or respond with error messages. These devices are ignored by network management server 104.

Network management server 104 polls the discovered devices in step S802, again using a network management protocol such as SNMP or DMI. In response, network devices that are supported by the browser-based network management system return status and configuration information for the devices. In step S803, this configuration information is stored in database 105.

In step S804, it is determined if configuration data in database 105 has been updated since the last occurrence of step S804. Such an update is stored in a queue, as explained below with reference to FIG. 8B. If configuration data in database 105 has been updated, flow proceeds to step S805, where network management server 104 updates the status and/or configuration of a targeted device on network 1 in accordance with the updated configuration data.

Next, flow pauses in step S806 until it is determined that it is time to repeat discovery and polling of network devices on network 1 for configuration and status information, in which case flow returns to step S801. Device discovery is repeated to keep database 105 current as to what devices are connected to network 1. Likewise, polling is repeated to keep database 105 current as to the status and configuration of those devices.

It should be noted that, in an alternative embodiment, status information for managed devices also is obtained by network management server 104 through an interrupt mechanism. For example, in the case of a network managed with SNMP, "traps" are used to send a message from a managed device to network management server 104 when the status of that device changes.

The process illustrated in FIG. 8B concerns interactions between the network management system and a browser. In step S810, it is determined if HTTP server 103 has received a URL-encoded request from browser 83 identifying one of the devices on network 1 and requesting the device's status and/or configuration. This status and/or configuration can be for a network device such as a printer, scanner or copier, or for a network interface device (e.g., a NIC) that connects such a network device to network 1.

If such a URL-encoded request has been received, flow proceeds to step S811, where HTTP server 103 dynamically generates a response, preferably in the form of HTML code. This HTML code is generated by accessing the CGI script (or ASP web page) identified by the URL. Then, HTTP server 103 generates the HTML code based on the CGI script (or ASP web page) and the entries in database 105 for the device identified in the URL-encoded request. In the case of a CGI script, HTTP server 103 executes that script, which accesses one of templates 107 in dependence on the nature of the request and accesses database 105 so as to complete the template. Then, the HTML code for the completed template is returned to browser 83 through HTTP server 103.

In step S812, it is determined if HTTP server 103 has received a URL-encoded request from browser 83 with an update to configuration data. If such a URL-encoded request has been received, flow proceeds to step S813, where a CGI script identified by the request is executed so as to update database 105 with the updated configuration data. This update is placed in a queue in the database so that the process of FIG. 8A can identify the change.

The interaction between the processes illustrated in FIGS. 8A and 8B occurs through database 105. In particular, when database 105 is updated in step S813 of FIG. 8B, this update is stored in a queue in the database. Then, the next time step S804 of FIG. 8A occurs, this queued update in the database causes flow to proceed to step S805, where the configuration of a managed device is updated accordingly.

By virtue of the foregoing operation, network administrators can view and update the configuration and status of network devices using the familiar interface of a web browser, such as NetScape®'s Navigator or Microsoft®'s Internet Explorer. As a result, the administrators do not need to learn different programs for each device, thereby saving time and simplifying network management. Furthermore, because the browser-based network management system of the invention is interposed between the administrators (and other users) and the network devices, the network devices only interact with the management system. As a result, the devices do not need to interact directly with multiple browsers, thereby reducing network traffic and preventing the network devices from becoming bogged down.

Figure 9:
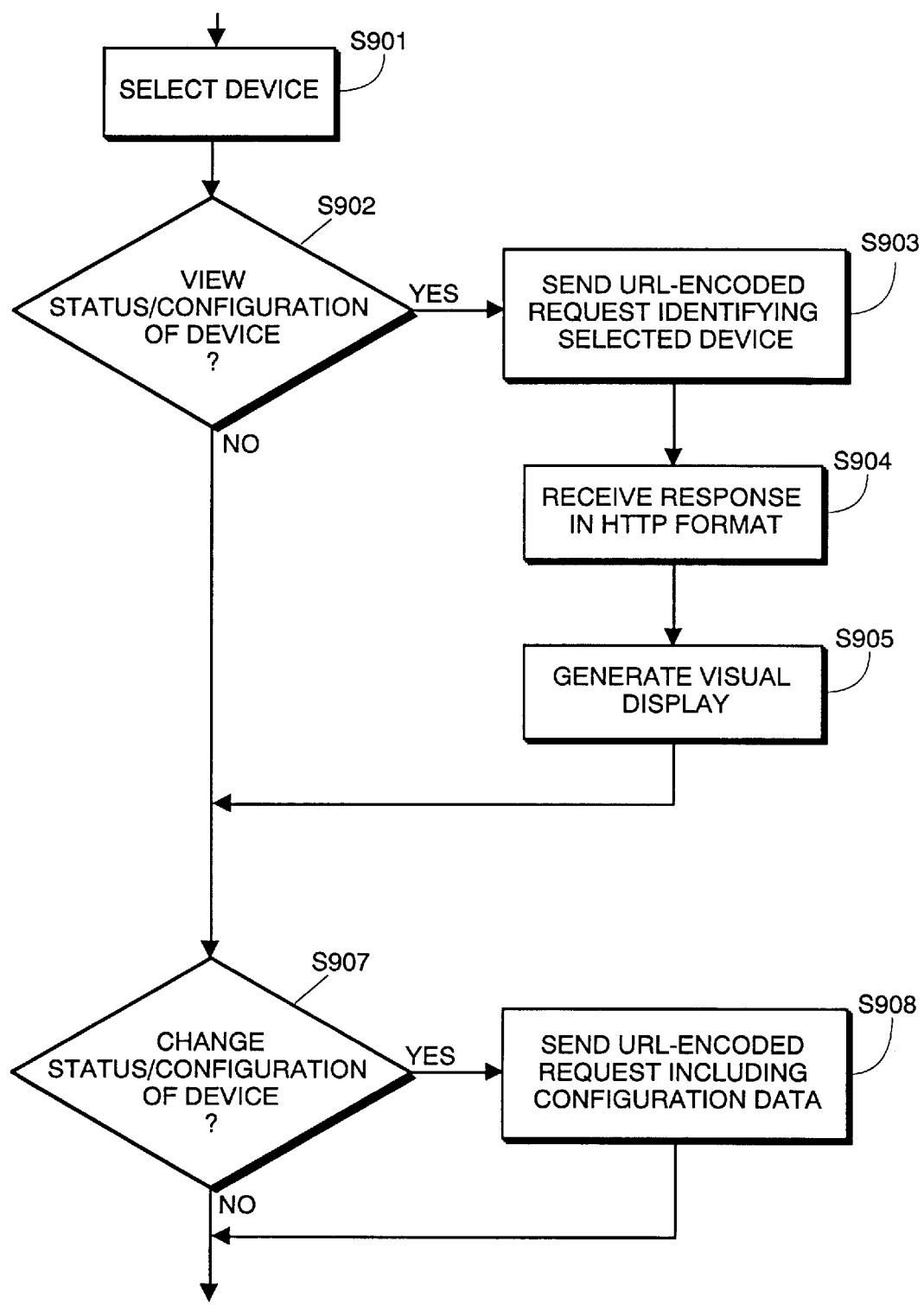
FIG. 9 is a flowchart for explaining the operation of the browser-based network management system according to the invention from the perspective of a browser.

FIG. 9 is a flowchart for explaining the operation of the browser-based network management system according to the invention from the perspective of a browser. Briefly, according to this aspect of the invention, a first URL-encoded request is sent to the management system. This first request identifies a targeted one of network devices connected to a network and requests status and/or configuration information for the targeted device. This status and/or configuration information can be for a network device such as a printer, scanner or copier, or for a network interface device (e.g., a NIC) that connects such a device to network 1. In response to the request, a response is received from the management system. The response is HTML code representative of a visual display of configuration information for the targeted one of the network devices. The browser generates this visual display. Then, a second URL-encoded request is sent to the management system. This second request includes updates to configuration data for the targeted one of the network devices.

In more detail, in step S901, a user selects one of the network devices on network 1, for example from the device list shown in FIG. 6. In step S903, if user input is received indicating that the user wants to view the status or configuration of a device, flow proceeds to step S904. This user input preferably takes the form of a conventional browser-type selection such as pointing to and clicking on a device name shown by browser interface 121.

In step S904, browser 83 sends a URL-encoded request to HTTP server 103 identifying the targeted device. In step S905, a response is received from HTTP server 103 in response to this URL-encoded request. The response preferably is HTML code representative of a visual display. In step S906, browser 83 generates the visual display or other information represented by the response.

If browser 83 receives user input that indicates that the user wants to change the status or configuration of a device on network 1, flow proceeds to step S909. This input preferably takes the form of a conventional browser input, for example, filling in a blank in the visual display shown on browser interface 121, making a selection from a drop-down menu, or the like.

In step S909, browser 83 sends a URL-encoded request including the status or configuration changes. This URL-encoded request identifies a CGI script (or ASP web page) that is run by HTTP server 103. As discussed above, this script (or web page) modifies database 105, which in turn causes network management server 104 to change the status or configuration of the targeted device accordingly.

By virtue of the foregoing operation, a user can obtain, monitor and control the status and configuration of network devices using a conventional browser. Because such browsers have a consistent look and feel, the user can perform these management operations without having to learn unfamiliar network management programs.

In general, the preferred embodiment of the browser-based network management system can be used to manage many different types of networks and network devices. These network include Windows NT® and UNIX networks that operate under one or more of the following protocols: TCP/IP, IPX, NetBIOS and Appletalk. Devices that can be managed include printers, scanners, copiers, facsimile machines and the like, along with the network interface devices that connect those devices to a network.

The invention has been described with respect to a particular illustrative embodiment. It is to be understood that the invention is not limited to the above described embodiment and that various changes and modifications may be made by those of ordinary skill in the art without departing from the spirit and scope of the invention.

What is claimed is:

1. A method for viewing and updating a configuration of at least one of a plurality of network devices connected to a network, comprising the steps of:

repeatedly polling each of the network devices over the network for configuration information;

storing the configuration information in a database;

receiving a first URL-encoded request from a requesting station, the first request identifying a targeted one of the network devices;

responsive to the first request, dynamically generating a response representative of a visual display of the configuration information for the targeted one of the network devices based at least in part on the configuration information stored in the database;

sending the response to the requesting station;

receiving a second URL-encoded request from the requesting station, the second request including configuration data for the targeted one of the network devices;

responsive to the second request, updating the database based on the configuration data; and updating the configuration of the targeted one of the network devices based on the updated database.

2. The method of claim 1, wherein the first request is URL-encoded for a CGI script that is used to dynamically generate the response.

3. The method of claim 1, wherein the first request is URL-encoded for an ASP web page that is used to dynamically generate the response.

4. The method of claim 1, wherein the response is dynamically generated HTML code.

5. The method of claim 1, wherein the response is dynamically generated text.

6. The method of claim 1, wherein the requesting station is a web browser.

7. The method of claim 1, wherein the requesting station is a dedicated thin client that communicates using hypertext transfer protocol.

8. The method of claim 1, wherein the first request and the second request are received over an other network different than the network to which the network devices are connected.

9. The method of claim 1, wherein the first request and the second request are received over the network to which the network devices are attached.

10. The method of claim 1, wherein the response is sent over an other network different than the network to which the network devices are connected.

11. The method of claim 1, wherein the response is sent over the network to which the network devices are connected.

12. The method of claim 1, wherein the targeted one of the network devices is updated using a network management protocol.

13. The method of claim 12, wherein the network management protocol is SNMP or DMI.

14. The method of claim 1, wherein the first URL-encoded request is for help information about the targeted device, and wherein the response is HTML code representative of a help page for the targeted device.

15. A method for viewing and updating a configuration of at least one of a plurality of network devices connected to a network, comprising the steps of:

repeatedly polling each of the network devices over the network for configuration information;
storing the configuration information in a database;
communicating with a requesting station using HTTP;
updating the database based on the communicating step; and
updating the configuration of one of the network devices based on the updated database.

16. A method for viewing and updating a configuration of at least one of a plurality of network devices connected to a network, comprising the steps of:

sending a first URL-encoded request to a management system, the first request identifying a targeted one of the network devices;
receiving a response from the management system, the response representative of a visual display of configuration information for the targeted one of the network devices;
generating the visual display; and
sending a second URL-encoded request to the management system, the second request including configuration data for the targeted one of the network devices.

17. The method of claim 16, wherein the first request is URL-encoded for a CGI script that is used to dynamically generate the response.

18. The method of claim 16, wherein the first request is URL-encoded for an ASP web page that is used to dynamically generate the response.

19. The method of claim 16, wherein the response is dynamically generated HTML code.

20. The method of claim 16, wherein the response is dynamically generated text.

21. The method of claim 16, wherein the first request and the second request are sent over an other network different than the network to which the network devices are connected.

22. The method of claim 16, wherein the first request and the second request are sent over the network to which the network devices are attached.

23. The method of claim 16, wherein the response is received over an other network different than the network to which the network devices are connected.

24. The method of claim 16, wherein the response is received over the network to which the network devices are connected.

25. The method of claim 16, wherein the first URL-encoded request is for help information about the targeted device, and wherein the response is HTML code representative of a help page for the targeted device.

26. An apparatus for viewing and updating a configuration of at least one of a plurality of network devices connected to a network, comprising:

a memory including a region for storing executable process steps; and
a processor for executing the executable process steps;
wherein the executable process steps include the steps of: (a) repeatedly polling each of the network devices over the network for configuration information; (b) storing the configuration information in a database; (c) receiving a first URL-encoded request from a requesting station, the first request identifying a targeted one of the network devices; (d) responsive to the first request, dynamically generating a response representative of a visual display of the configuration information for the targeted one of the network devices based at least in part on the configuration information stored in the database; (e) sending the response to the requesting station; (f) receiving a second URL-encoded request from the requesting station, the second request including configuration data for the targeted one of the network devices; (g) responsive to the second request, updating the database based on the configuration data; and (h) updating the configuration of the targeted one of the network devices based on the updated database.

27. The apparatus of claim 26, wherein the first request is URL-encoded for a CGI script that is used to dynamically generate the response.

28. The apparatus of claim 26, wherein the first request is URL-encoded for an ASP web page that is used to dynamically generate the response.

29. The apparatus of claim 26, wherein the response is dynamically generated HTML code.

30. The apparatus of claim 26, wherein the response is dynamically generated text.

31. The apparatus of claim 26, wherein the requesting station is a web browser.

32. The apparatus of claim 26, wherein the requesting station is a dedicated thin client that communicates using hypertext transfer protocol.

33. The apparatus of claim 26, wherein the first request and the second request are received over an other network different than the network to which the network devices are connected.

34. The apparatus of claim 26, wherein the first request and the second request are received over the network to which the network devices are attached.

35. The apparatus of claim 26, wherein the response is sent over an other network different than the network to which the network devices are connected.

36. The apparatus of claim 26, wherein the response is sent over the network to which the network devices are connected.

37. The apparatus of claim 26, wherein the targeted one of the network devices is updated using a network management protocol.

38. The apparatus of claim 37, wherein the network management protocol is SNMP or DMI.

39. The apparatus of claim 26, wherein the first URL-encoded request is for help information about the targeted device, and wherein the response is HTML code representative of a help page for the targeted device.

40. An apparatus for viewing and updating a configuration of at least one of a plurality of network devices connected to a network, comprising:

a memory including a region for storing executable process steps; and a processor for executing the executable process steps;

wherein the executable process steps include the steps of: (a) repeatedly polling each of the network devices over the network for configuration information; (b) storing the configuration information in a database; (c) communicating with a requesting station using HTTP; (d) updating the database based on the communicating step; and (e) updating the configuration of one of the network devices based on the updated database.

41. An apparatus for viewing and updating a configuration of at least one of a plurality of network devices connected to a network, comprising the steps of:

a memory including a region for storing executable process steps; and a processor for executing the executable process steps;

wherein the executable process steps include the steps of: (a) sending a first URL-encoded request to a management system, the first request identifying a targeted one of the network devices; (b) receiving a response from the management system, the response representative of a visual display of configuration information for the targeted one of the network devices; (c) generating the visual display; and (d) sending a second URL-encoded request to the management system, the second request including configuration data for the targeted one of the network devices.

42. A browser-based network management system, the system comprising computer-executable process steps to view and update a configuration of at least one of a plurality of network devices connected to a network, the computer-executable process steps comprising:

code to repeatedly poll each of the network devices over the network for configuration information;

code to store the configuration information in a database;

code to receive a first URL-encoded request from a requesting station, the first request identifying a targeted one of the network devices;

code to dynamically generate a response responsive to the first request, the response representative of a visual display of the configuration information for the targeted one of the network devices based at least in part on the configuration information stored in the database;

code to send the response to the requesting station;

code to receive a second URL-encoded request from the requesting station, the second request including configuration data for the targeted one of the network devices;

code to update the database, responsive to the second request, based on the configuration data; and code to update the configuration of the targeted one of the network devices based on the updated database.

43. A browser-based network management system, the system comprising computer-executable process steps to view and update a configuration of at least one of a plurality of network devices connected to a network, the computer-executable process steps comprising:

code to repeatedly poll each of the network devices over the network for configuration information;

code to store the configuration information in a database;

code to communicate with a requesting station using HTTP;

code to update the database based on the communication with the requesting station; and code to update the configuration of one of the network devices based on the updated database.

44. A computer-readable medium which stores a browser-based network management system, the system comprising computer-executable process steps to view and update a configuration of at least one of a plurality of network devices connected to a network, the computer-executable process steps comprising:

a polling step to repeatedly poll each of the network devices over the network for configuration information;

a storing step to store the configuration information in a database;

a receiving step to receive a first URL-encoded request from a requesting station, the first request identifying a targeted one of the network devices;

a generating step to dynamically generate a response responsive to the first request, the response representative of a visual display of the configuration information for the targeted one of the network devices based at least in part on the configuration information stored in the database;

a sending step to send the response to the requesting station;

a receiving step to receive a second URL-encoded request from the requesting station, the second request including configuration data for the targeted one of the network devices;

an updating step to update the database, responsive to the second request, based on the configuration data; and an updating step to update the configuration of the targeted one of the network devices based on the updated database.

45. A computer-readable medium which stores a browser-based network management system, the system comprising computer-executable process steps to view and update a configuration of at least one of a plurality of network devices connected to a network, the computer-executable process steps comprising:

a polling step to repeatedly poll each of the network devices over the network for configuration information;

a storing step to store the configuration information in a database;

a communicating step to communicate with a requesting station using HTTP;

an updating step to update the database based on the communicating step; and an updating step to update the configuration of one of the network devices based on the updated database.

46. A method for viewing and updating a configuration of at least one of a plurality of network devices connected to a network, comprising the steps of:

polling each of the network devices over the network for configuration information;

storing the configuration information in a memory;

receiving a first request from a requesting station, the first request identifying a targeted one of the network devices;

responsive to the first request, generating a response representative of the configuration information for the targeted one of the network devices based on the configuration information stored in the memory;

sending the response to the requesting station;

receiving a second request from the requesting station, the second request including configuration data for the targeted one of the network devices; and responsive to the second request, updating the configuration of the targeted one of the network devices based on the configuration data included in the second request.

47. The method according to claim 46, further comprising the step of, responsive to the second request, updating the configuration information stored in the memory based on the configuration data included in the second request.

48. The method according to claim 46, wherein the first request and the second request are received using hypertext transfer protocol.

49. The method according to claim 46, wherein the response is HTML data representative of a page for the targeted one of the network devices.

50. The method according to claim 46, wherein the request is received using a first protocol and the configuration of the targeted one of the network devices is updated using a second protocol different from the first protocol.

51. The method according to claim 46, wherein the configuration of the targeted one of the network devices based on the response is displayed on a web browser.

52. A method for viewing and updating a configuration of at least one of a plurality of network devices connected to a network, comprising the steps of:
   polling each of the network devices over the network for configuration information;
   storing the configuration information in a memory;
   communicating with a requesting station; and
   updating the configuration information stored in the memory and the configuration of the targeted one of the network devices based on the communicating step.

53. The method according to claim 52, wherein the communicating step performs a communication with HTTP server and a web browser using HTTP.

54. The method according to claim 52, wherein the polling step polls the network device over the network for configuration information, when the network device is discovered.

55. A method for viewing and updating a configuration of at least one of a plurality of network devices connected to a network, comprising the steps of:
   sending a first request to a management station, the first request identifying a targeted one of the network devices;
   receiving a response representative of a visual display of the configuration information for the targeted one of the network devices;
   displaying the configuration of the targeted one of the network devices; and
   sending a second request to the management station, the second request including configuration data for the targeted one of the network devices.

56. The method according to claim 55, wherein the first request and the second request are sent using a HTTP protocol.

57. The method according to claim 55, wherein the response is dynamically generated HTML data.

58. The method according to claim 55, wherein the configuration of the targeted one of the network devices based on the response is displayed on a browser.

59. An apparatus for viewing and updating a configuration of at least one of a plurality of network devices connected to a network, comprising:
   memory for storing program; and
   processor for executing executable process steps based on the program;
   wherein the executable process steps include the steps of:
   polling each of the network devices over the network for configuration information;
   storing the configuration information in a memory;
   receiving a first request from a requesting station, the first request identifying a targeted one of the network devices;
   responsive to the first request, generating a response representative of the configuration information for the targeted one of the network devices based on the configuration information stored in the memory;
   sending the response to the requesting station;
   receiving a second request from the requesting station, the second request including configuration data for the targeted one of the network devices; and
   responsive to the second request, updating the configuration of the targeted one of the network devices based on the configuration data included in the second request.

60. The apparatus according to claim 59, wherein the executable process steps include the step of, responsive to the second request, updating the configuration information stored in the memory based on the configuration data included in the second request.

61. An apparatus for viewing and updating a configuration of at least one of a plurality of network devices connected to a network, comprising:
   polling means for polling each of the network devices over the network for configuration information;
   storing means for storing the configuration information in a memory;
   first receiving means for receiving a first request from a requesting station, the first request identifying a targeted one of the network devices;
   generating means for, responsive to the first request, generating a response representative of the configuration information for the targeted one of the network devices based on the configuration information stored in the memory;
   sending means for sending the response to the requesting station;
   second receiving means for receiving a second request from the requesting station, the second request including configuration data for the targeted one of the network devices; and
   updating means for, responsive to the second request, updating the configuration of the targeted one of the network devices based on the configuration data included in the second request.

62. The apparatus according to claim 61, wherein said updating means, responsive to the second request, updates the configuration information stored in the memory based on the configuration data included in the second request.

63. An apparatus for viewing and updating a configuration of at least one of a plurality of network devices connected to a network, comprising:
   memory for storing program; and
   processor for executing executable process steps based on the program;
   wherein the executable process steps include the steps of:
   polling each of the network devices over the network for configuration information;
   storing the configuration information in a memory;
   communicating with a requesting station; and updating the configuration information stored in the memory and the configuration of the targeted one of the network devices based on the communicating step.

64. The apparatus according to claim 63, wherein the communicating step performs a communication with HTTP server and a web browser using HTTP.

65. The apparatus according to claim 63, wherein the polling step polls the network device over the network for configuration information, when the network device is discovered.

66. An apparatus for viewing and updating a configuration of at least one of a plurality of network devices connected to a network, comprising:
polling means for polling each of the network devices over the network for configuration information;
storing means for storing the configuration information in a memory;
communicating means for communicating with a requesting station; and
updating means for updating the configuration information stored in the memory and the configuration of the targeted one of the network devices based on the communicating step.

67. The apparatus according to claim 66, wherein the communicating means performs a communication with HTTP server and a web browser using HTTP.

68. The apparatus according to claim 66, wherein the polling means polls the network device over the network for configuration information, when the network device is discovered.

69. An apparatus for viewing and updating a configuration of at least one of a plurality of network devices connected to a network, comprising:
memory for storing program; and
processor for executing executable process steps based on the program;
wherein the executable process steps include the steps of:
sending a first request to a management station, the first request identifying a targeted one of the network devices;
receiving a response representative of a visual display of the configuration information for the targeted one of the network devices;
displaying the configuration of the targeted one of the network devices; and
sending a second request to the management station, the second request including configuration data for the targeted one of the network devices.

70. The apparatus according to claim 69, wherein the first request and the second request are sent using HTTP protocol and the response is dynamically generated HTTP data.

71. An apparatus for viewing and updating a configuration of at least one of a plurality of network devices connected to a network, comprising:
first sending means for sending a first request to a management station, the first request identifying a targeted one of the network devices;
receiving in means for receiving a response representative of a visual display of the configuration information for the targeted one of the network devices;
displaying means for displaying the configuration of the targeted one of the network devices; and
second sending means for sending a second request to the management station, the second request including configuration data for the targeted one of the network devices.

72. The apparatus according to claim 71, wherein the first request and the second request are sent using a HTTP protocol and the response is dynamically generated HTML data.

73. A computer-readable medium which storing a program for viewing and updating a configuration of at least one of a plurality of network devices connected to a network, the program controlling a computer to perform the steps of:
polling each of the network devices over the network for configuration information;
storing the configuration information in a memory;
receiving a first request from a requesting station, the first request identifying a targeted one of the network devices;
responsive to the first request, generating a response representative of the configuration information for the targeted one of the network devices based on the configuration information stored in the memory;
sending the response to the requesting station;
receiving a second request from the requesting station, the second request including configuration data for the targeted one of the network devices; and
responsive to the second request, updating the configuration of the targeted one of the network devices based on the configuration data included in the second request.

74. The medium according to claim 73, wherein the program controlling a computer to perform the step of, responsive to the second request, updating the configuration information stored in the memory based on the configuration data included in the second request.

75. The medium according to claim 73, wherein the first request and the second request are received using hypertext transfer protocol.

76. The medium according to claim 73, wherein the response is HTML data representative of a page for the targeted one of the network devices.

77. The medium according to claim 73, wherein the request is received using a first protocol and the configuration of the targeted one of the network devices is updated using a second protocol different from the first protocol.

78. The medium according to claim 73, wherein the configuration of the targeted one of the network devices based on the response is displayed on a web browser.

79. A computer-readable medium which storing a program for viewing and updating a configuration of at least one of a plurality of network devices connected to a network, the program controlling a computer to perform the steps of:
polling each of the network devices over the network for configuration information;
storing the configuration information in a memory;
communicating with a requesting station; and
updating the configuration information stored in the memory and the configuration of the targeted one of the network devices based on the communicating step.

80. The medium according to claim 79, wherein the communicating step performs a communication with HTTP server and a web browser using HTTP.

81. The medium according to claim 79, wherein the polling step polls the network device over the network for configuration information, when the network device is discovered.

82. A computer-readable medium which storing a program for viewing and updating a configuration of at least one of a plurality of network devices connected to a network, the program controlling a computer to perform the steps of:

sending a first request to a management station, the first request identifying a targeted one of the network devices;

receiving a response representative of a visual display of the configuration information for the targeted one of the network devices;

displaying the configuration of the targeted one of the network devices; and sending a second request to the management station, the second request including configuration data for the targeted one of the network devices.

83. The medium according to claim 82, wherein the first request and the second request are sent using a HTTP protocol.

84. The medium according to claim 82, wherein the response is dynamically generated HTML data.

85. The medium according to claim 82, wherein the configuration of the targeted one of the network devices based on the response is displayed on a browser.

86. A computer-readable program for viewing and updating a configuration of at least one of a plurality of network devices connected to a network, the program controlling a computer to perform the steps of:

polling each of the network devices over the network for configuration information;

storing the configuration information in a memory;

receiving a first request from a requesting station, the first request identifying a targeted one of the network devices;

responsive to the first request, generating a response representative of the configuration information for the targeted one of the network devices based on the configuration information stored in the memory;

sending the response to the requesting station;

receiving a second request from the requesting station, the second request including configuration data for the targeted one of the network devices; and responsive to the second request, updating the configuration of the targeted one of the network devices based on the configuration data included in the second request.

87. The program according to claim 86, wherein the program controlling a computer to perform the step of, responsive to the second request, updating the configuration information stored in the memory based on the configuration data included in the second request.

88. The program according to claim 86, wherein the first request and the second request are received using hypertext transfer protocol.

89. The program according to claim 86, wherein the response is HTML data representative of a page for the targeted one of the network devices.

90. The program according to claim 86, wherein the request is received using a first protocol and the configuration of the targeted one of the network devices is updated using a second protocol different from the first protocol.

91. The program according to claim 86, wherein the configuration of the targeted one of the network devices based on the response is displayed on a web browser.

92. A computer-readable program for viewing and updating a configuration of at least one of a plurality of network devices connected to a network, the program controlling a computer to perform the steps of:

polling each of the network devices over the network for configuration information;

storing the configuration information in a memory;

communicating with a requesting station; and updating the configuration information stored is the memory and the configuration of the targeted one of the network devices based on the communicating step.

93. The program according to claim 92, wherein the communicating step performs a communication with HTTP server and a web browser using HTTP.

94. The program according to claim 92, wherein the polling step polls the network device over the network for configuration information, when the network device is discovered.

95. A computer-readable program for viewing and updating a configuration of at least one of a plurality of network devices connected to a network, the program controlling a computer to perform the steps of:

sending a first request to a management station, the first request identifying a targeted one of the network devices;

receiving a response representative of a visual display of the configuration information for the targeted one of the network devices;

displaying the configuration of the targeted one of the network devices; and sending a second request to the management station, the second request including configuration data for the targeted one of the network devices.

96. The program according to claim 95, wherein the first request and the second request are sent using a HTTP protocol.

97. The program according to claim 95, wherein the response is dynamically generated HTML data.

98. The program according to claim 95, wherein the configuration of the targeted one of the network devices based on the response is displayed on a browser.

* * * * *

UNITED STATES PATENT AND TRADEMARK OFFICE
CERTIFICATE OF CORRECTION

PATENT NO.     : 6,308,205 B1
DATED          : October 23, 2001
INVENTOR(S)    : Carcerano et al.

It is certified that error appears in the above-identified patent and that said Letters Patent is hereby corrected as shown below:

Title page,
Item [56], References Cited, OTHER PUBLICATIONS, "Stanek, William R., 'Writing CGI Scripts' Web Publishing Unleased," should read -- Stanek, William R., 'Writing CGI Scripts' Web Publishing Unleashed --.

Column 7,
Line 16, "maim" should read -- main --.

Column 23,
Line 58, "in" should be deleted.

Column 24,
Line 5, "storing" should read -- stores --;
Lines 46 and 64, "storing" should read -- stores --.

Signed and Sealed this

Fifteenth Day of April, 2003

JAMES E. ROGAN
*Director of the United States Patent and Trademark Office*